United States Patent [19]

Cary

[11] 4,103,696

[45] Aug. 1, 1978

[54] CONTROL VALVE

[76] Inventor: Francis H. Cary, Apple Hill Dr., North Scituate, R.I. 02857

[21] Appl. No.: 687,924

[22] Filed: May 19, 1976

Related U.S. Application Data

[63] Continuation-in-part of Ser. No. 408,096, Oct. 19, 1973, abandoned.

[51] Int. Cl.² ............................................ F16K 47/00
[52] U.S. Cl. .................... 137/14; 137/625.3; 137/625.38; 137/601; 138/26
[58] Field of Search .................. 137/592, 601, 625.37, 137/625.3, 625.38, 625.35, 625.39, 625.33, 14, 599, 604; 251/282; 239/545, 421; 138/26

[56] References Cited

U.S. PATENT DOCUMENTS 1,436,417  11/1922  Trumble ........................ 137/599 X
3,660,979  5/1972  Kamakura et al. .............. 137/207 X

FOREIGN PATENT DOCUMENTS 2,023,862  12/1971  Fed. Rep. of Germany ........... 137/604
1,980 of     1862  United Kingdom ................ 137/625.3
621,785    4/1949  United Kingdom .................... 239/421

*Primary Examiner*—Arnold Rosenthal
*Attorney, Agent, or Firm*—Barlow & Barlow

[57] ABSTRACT

A control valve is provided having a control structure therein in which dissipation of liquid pressure energy is achieved by the use of two matched and opposed submerged jets that have substantially equal mass flow which result is achieved by utilizing a wall that defines an interior chamber with the matched jets physically comprising 180° opposed orifices through the wall and the control means simultaneously adjusts the area of the orifices.

4 Claims, 8 Drawing Figures

CONTROL VALVE

CROSS REFERENCE TO RELATED APPLICATION

This application is a continuation-in-part of my earlier filed application, Ser. No. 408,096, filed Oct. 19, 1973 now abandoned.

BACKGROUND OF THE INVENTION

In control valve structures that have been used in the past, one of the major problems that has presented itself has been cavitation that results on the outlet port of a normal control valve due to the pressure drop through the valve. In the hydraulics of a normal valve there is liquid flowing to the valve which is under pressure and the valve, in effect, presents a throttling device in the flow stream. As the liquid passes through the valve structure, the head energy of the flowing mass is converted to kinetic energy and when this conversion takes place at high pressure dissipation, the static pressure of the liquid drops to a pressure less than the vapor pressure of the liquid and this causes cavitation and flashing of the liquid into a gaseous state which on collapse represents damage to the valve parts and the downstream piping, together with noise and vibrational effects which are well known to those skilled in the art. See, for example, Stiles, G. F., November 1961, "Cavitation in Control Valves", Instruments and Control Systems, Volume 34, No. 11. In the art there are several designs to achieve some control of cavitation. One of the forms that the prior art valves take is, for example, stepped cone valves, which present a frictional loss to the liquid stream as it passes therealong and further gives a multiple velocity change throughout the steps. Another form uses abraded apertures through a valve plug, such as shown in the Curran U.S. Pat. No. 2,918,087. Still other forms are multiple valve plugs rather than utilizing a single plug in a structure which, in effect, creates a plurality of restricting orifices and thus takes the pressure drop in a series of small steps. Still a further approach is to utilize fluid vortexes within a plurality of cascaded stages where the fluid is turned 90° as it passes through from one stage to the next and spirals around the plug. In all of these prior art valves, considerable expense is required to produce them, and in some cases they do not control cavitation to a degree where it can be beneficial.

SUMMARY OF THE INVENTION

It has been found that by placing two adjustable area jets that have an equal mass flow in 180° opposition and in a specific spacing between the jet forming means, that the hydraulic energy of the jets can be converted into heating of the fluid by a stable eddy formation in a restricted volume of space. In a given valve structure the spacing of the jet forming means is a fixed dimension, and it is therefore necessary to provide means for allowing this fixed dimension to give proper dissipation at different valve openings and head dissipations. In effect, the twin jets that come out of the opposed orifices impact in the center of the valve and form an ellipsoidal dissipating pressure volume. The pressure at the center of this area is at substantially the inlet pressure, and by properly spacing the opposed orifices, the vena contracta that is created by the jet discharge will be maintained adjacent to the surface of the ellipsoid. The stable decreasing velocity gradient within the ellipsoid dissipates the pressure energy, and the small cavitation zone that is present is extremely short in length since the cavitation zone is effectively from the vena contracta downstream thereof, and inasmuch as the vena contracta is close to the ellipsoid, these zones become very short. Furthermore, the velocity of the jet at the vena contracta location is very high and can be shown to be approximately equal to 12.2 times the square root of the pressure differential. Therefore, the time for cavitation voids to grow is extremely short.

DESCRIPTION OF THE PREFERRED EMBODIMENT

Figure 1:
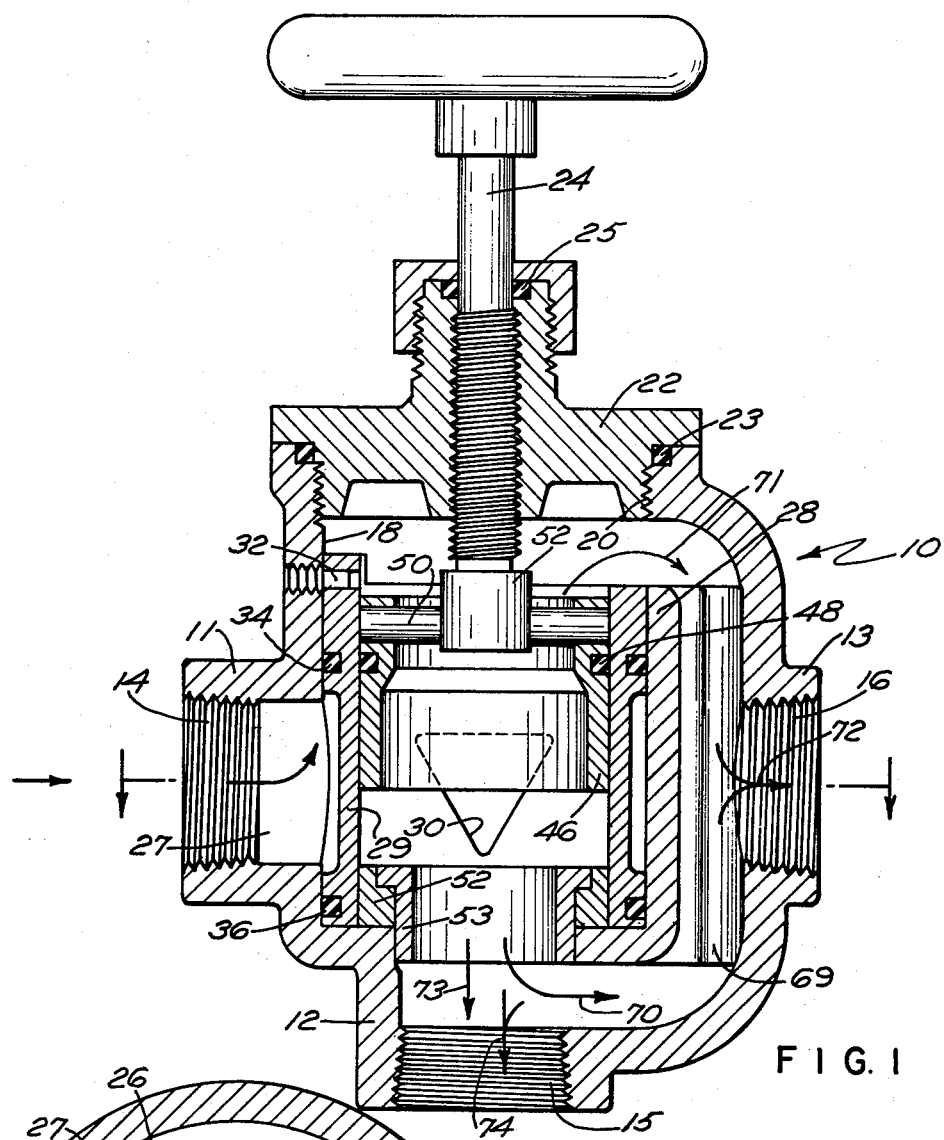
FIG. 1 is a sectional view showing a complete valve made in accordance with the principles of the invention.

In proceeding with the invention, there is provided a valve body having an inlet port and a pair of outlet ports so that the valve may be used as a 90° valve or a straight in line valve depending upon which of the outlet ports is sealed by a plug. Also in the drawings a handwheel operator is illustrated, but it should be understood that other types of operators may be utilized as well known to those skilled in the art.

With reference specifically to FIG. 1, the valve body generally designated 10 comprises a cast member with bosses 11, 12 and 13 extending therefrom to provide inlet port 14 and outlet ports 15 and 16. For convenience in manufacture, the body 10 is cast with a substantially hollow interior having a substantially circular interior wall 18 which is open at its top where a threaded opening 20 may be provided and into which a cover 22 may be screwed with a sealing gasket means 23. Within the cover 22 is located a valve actuator stem 24 which is suitable sealed therein with a packing at 25 and which forms an actuating means for orifices 30, 31, as will presently appear. Substantially midway of the wall 18 and in continuation of inlet boss 11 is a circular enlargement having inner wall 26 forming a passage 27 which terminates at a wall 28 which, as can be seen in FIG. 2, provides a passage to the outlet port 15 or 16.

Preferably a piece of soft stainless steel tubing 29 forms a wall means and is punched with a pair of opposed orifices or apertures 30, 31. These apertures can take a variety of shapes and are shown herein as being somewhat triangular in outline shape to give the desired linear valve characteristic with respect to stem travel. This tubing 29 may be held in proper orientation position by means of a locating pin 32 as seen in FIG. 1. The OD of the tubing is sealed to the interior wall 18 of the valve body by two static O-rings 34, 36. The inlet flow through the port 14 is divided into two equal parts as seen in FIG. 2, which parts form symmetrical flow paths and are designated by the arrows 38, 39, and is channeled around the passage 27 so that it will enter the orifices or apertures 30, 31 as seen by the arrows 41, 42 and be directed to the chamber formed by the wall means 29.

The flow control means is formed by a slidable tubing member 46 which is inserted into the internal diameter of the tubing member 29. At its upper boundary an O-ring seal 48 is provided and a pair of ears 50 cross the upper end of the flow control means tubing 46 so that attachment to the lower end 52 of the actuator stem 24 may be effected. At the lower end of the tubing 29 there is provided a form of a seat which can be a plastic ring seat 52 held in place by a press fit bushing 53 or alternately a hardened or ground seat if high temperature applications are envisioned for the use of the valve of this invention. In this fashion bubble tight shutoff on the valve closure can be achieved once the flow control means tube 46 is completely in a down direction and engaging the seat.

Figure 2:
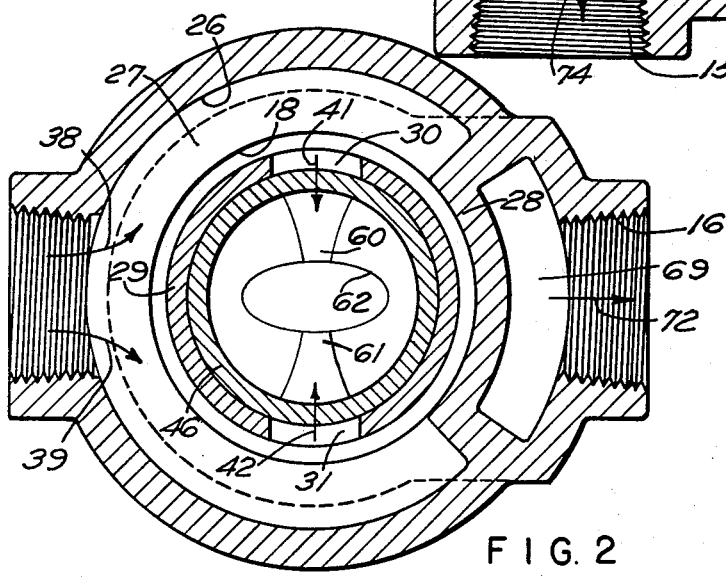
FIG. 2 is a central sectional view taken substantially on lines 2—2 of FIG. 1.

It will be noted in the diagrammatic representation in FIG. 2 that after the flow passes through the apertures or orifices 30 and 31, that jets will be formed by the fluid as it passes through the orifices and these jets will form a vena contracta as at 60 and 61 and will combine and dissipate the differential pressure in a dissipation zone shown by the elliptical line 62 in FIG. 2. The pressure at the center of the ellipsoid 62 is substantially the inlet pressure even though this point is downstream of the throttling orifices, and it has been found that by proper spacing of the orifice apertures 30 and 31 that the vena contracta at 60 and 61 may be made adjacent the surface of the ellipsoid 62. It has been found in practice that the ideal spacing in order to achieve this particular result of the apertures or orifices 30, 31 is substantially within the range of $-5\%$ to $+30\%$ of a distance S defined by the expression $[1.3 + 0.1 \sqrt[3]{\Delta P}]d$ where $\Delta P$ = the maximum design dissipation pressure in pounds per square inch and $d$ is the inlet supply port diameter in inches.

The exit flow from this valve for in-line ports is both upward as viewed in FIG. 1 and downward as designated by the arrows 70 and 71 into chamber 69 formed by wall 28 where the flow will be re-combined and proceed outwardly as indicated by the double arrow 72. The exit flow for angle ports as viewed in FIG. 1 is both upward and then downward through the vertical passageway as shown by arrows 71 and 73; and downward through the center valve section as shown by arrow 74.

It will be seen that with the use of two watched jets which generate equal flow rates a stable dissipation area can be formed. The use of a plurality of jets destroys the stability. If nozzles are substituted for the orifice configuration, it will be appreciated that different spacings will be necessary to achieve the same results.

Figure 6:
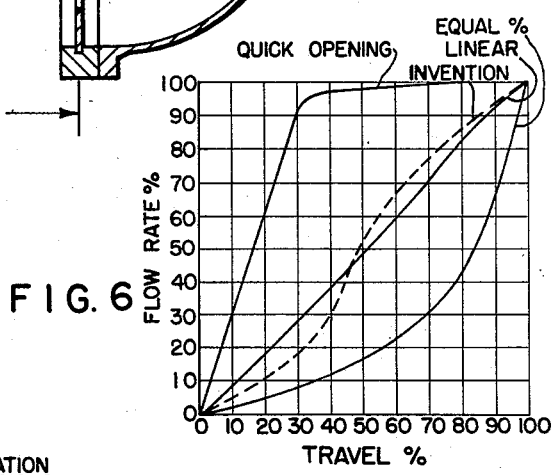
FIGS. 6, 7 and 8 are graphical representations of characteristics of valve operation.
Figure 7:
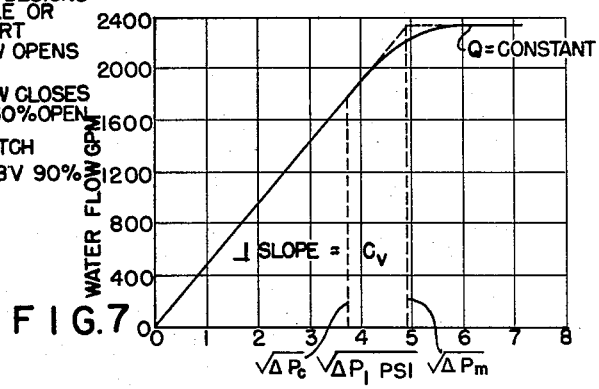

With a valve of the configuration described above, a number of desirable features are attained. Referring to FIG. 6 of the drawings, there is illustrated the flow characteristics of a valve of three different types in which the amount of flow through the valve has been diagrammed as a percentage of stem travel. Normally a characteristic is selected to suit the particular application to obtain the type of control desired. The flow characteristic of valve flow coefficient $C_v$ is expressed as the ratio of flow in gallons per minute divided by the square root of the differential pressure over the specific gravity of water or the fluid which is passing through the valve. Now if we plot the flow as against the square root of the differential pressure (see FIG. 7), we can obtain an idea of the valve's liquid flow characteristics and coefficient $C_v$. It has been established in tests that a departure from a straight line relationship between the liquid flow rate and the square root of the differential pressure indicates cavitation. FIG. 7, in effect, represents a four-inch Vee Ball valve where the beginning of the curve is a straight line that corresponds to the valve flow coefficient of this particular valve. When the square root of the differential pressure reached 3.75, as illustrated by the first broken line, the curve began to veer off to the right indicating that cavitation had begun. There are a number of dimensionless ratios which can be used to describe points where cavitation begin. $K_c$ which is sometimes known as the cavitation index is used to describe the point of initial departure from a proportional relationship as seen in FIG. 7 and is a ratio experimentally determined. It is defined as the ratio of the pressure differential across the valve at a point of deviation from a straight line divided by the difference between the valve inlet pressure and the liquid vapor pressure. There is still another dimensionless ratio called recovery coefficient which is also experimentally determined in identifying the point above which no increase in flow rate is achieved for an additional increase in pressure drop. In effect, it defines what is termed in the art as a fully choked flow condition and can be thought of as a measure of the lost pressure converted to velocity at the vena contracta that will be recovered at the valve outlet. The coefficient $K_m$ is defined as the differential pressure at the intersection of the straight lines where Q is proportional to the square root of the pressure differential (see the second broken line in FIG. 7) and the line where flow becomes a constant divided by the difference between the valve inlet pressure and the vapor pressure of the liquid.

Figure 8:
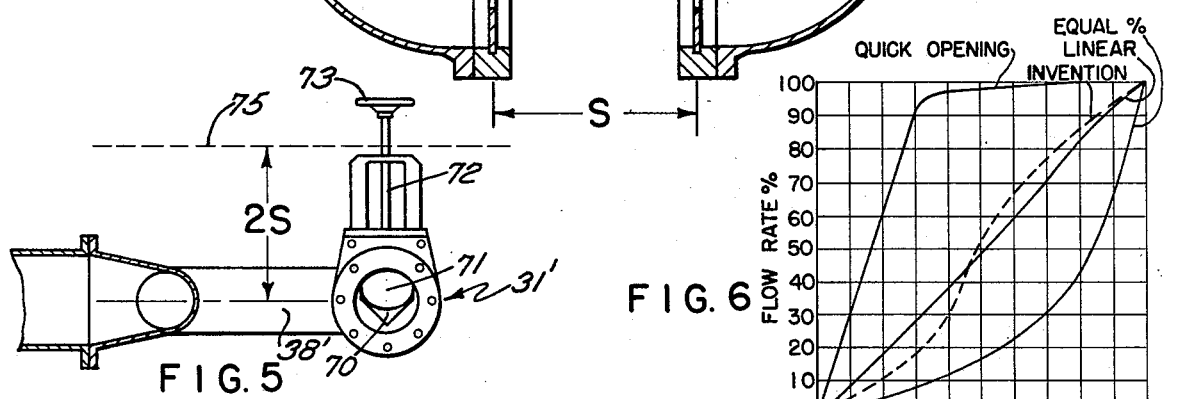

Comparing the performance of the instant invention with known valves renders results as shown in FIG. 8. In FIG. 8 there is a plot of the recovery coefficient or the cavitation index against the pressure differential divided by the difference between the valve inlet pressure and the vapor pressure of the liquid. As will be seen, the instant valve evidences superior test performance as compared to other valve designs of the prior art, the most exemplary of which are the special cavitation resistant designs followed respectively by globe valves, angle valves and other types. Additionally test results of the flow rate to stem travel yield the broken line curve as seen in FIG. 6 where the valve under test utilized 60° triangular orifices 30 as seen in FIG. 1 of the drawings.

Figure 3:
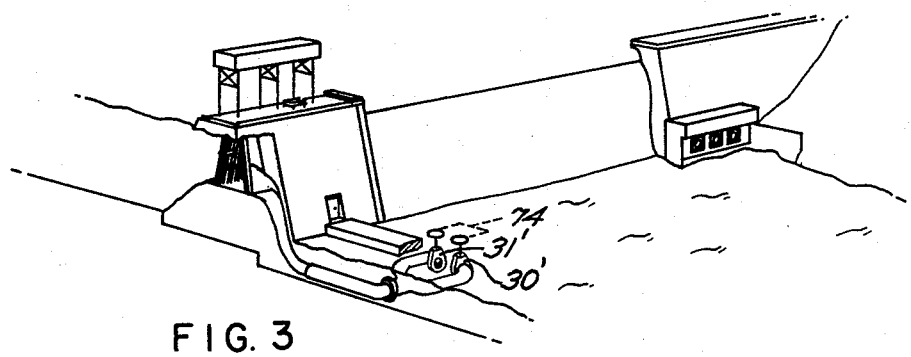
FIG. 3 is a perspective view of a typical arrangement for another embodiment of the invention.
Figure 4:
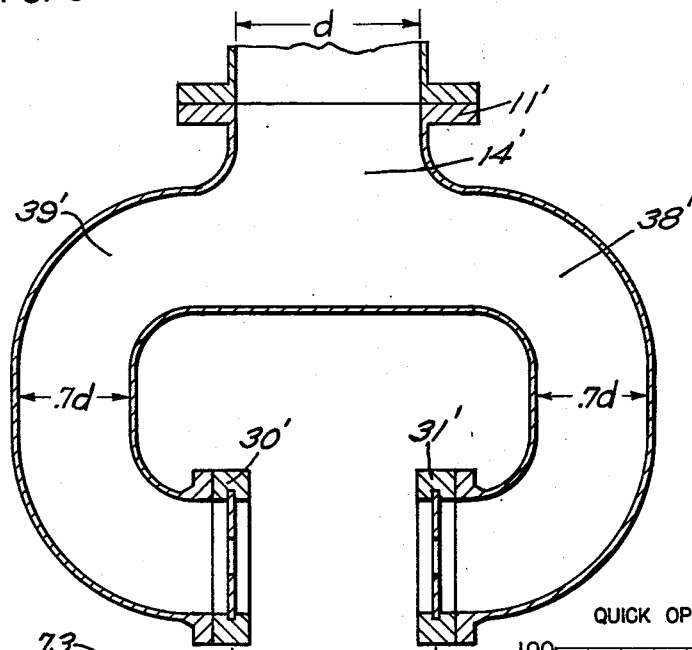
FIG. 4 is a central sectional view of another embodiment.
Figure 5:
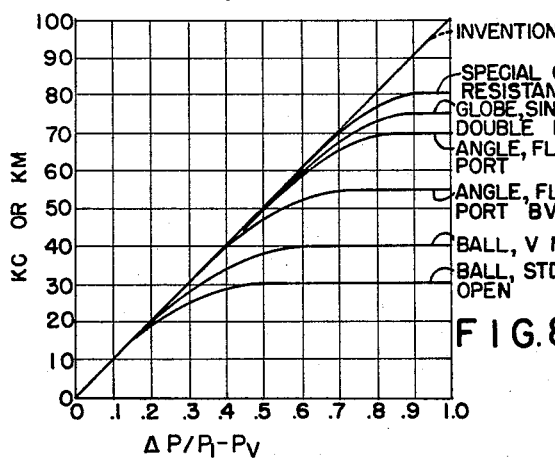
FIG. 5 is an elevational sectional view of another embodiment.

Referring to FIGS. 3, 4 and 5 of the drawings, there is illustrated application for liquid control utilizing the principles of the instant invention. In an application such as a dam discharge as seen in FIG. 3, there is a requirement to dissipate full inlet pressure all the way down to atmospheric. Such a head loss situation creates full cavitation of the flow downstream of the control valve. To this end, a structure consisting of two opposed knife gate valves submerged in the downstream water and being fed by symmetrical flow paths may be used. Referring to FIG. 4 there is shown a flange 11' which couples a pair of diverging pipe sections having inlet flow passage 14' that go into passages 38' and 39' and thence to control gate valves 30', 31' which are spaced apart a distance S as in the previous embodiment. The two symmetrical flow paths 38' and 39' should have a diameter of approximately 0.7 of the main inlet diameter 14' and equal length so that equal head loss in the liquid flow to valves 30', 31' is had. Each of the knife gate valves should be identical and by way of example in FIG. 5 there is illustrated a typical knife gate valve which is equipped with a V notch flow regulator insert 70, the knife gate 71 being of the complementary shape and structure and being operated by a stem 72 and for simplicity a hand wheel 73. It should be understood, however, that the valve openings should be identical at any one time for both valves 30' and 31', and therefore, the operators or actuating means such as the hand wheel 73 should be tied together as shown by the dotted lines 74 so that a matched motion may be had. It would be understood by those skilled in the art that suitable operators and remote control positioners would be utilized in a particular application. Illustrated by broken line 75 in FIG. 5, there is diagrammed the water level of the lake, stream or what have you downstream of the dam, for example, as seen in FIG. 3, and in order for this application to work properly, it has been found that the submergence of the valves 30' and 31' as seen in FIG. 5 should be equal to 2S, that is twice the orifice spacing distance with no maximum submergence dictated except for a suitable clearance above the bottom of the lake or pond which should be equal to at least 2S.

The above arrangement as seen in FIGS. 3, 4 and 5 entails the use of two 180° closed jets of equal mass flow rates with the jet forming means positioned at the prescribed separation S. Jet forming means is the restricting orifice as has been known in the art. Since cavitation cavities initiate at the vena contracta of the jet, and since the vena contracta is in a liquid filled space away from all physical elements, the impingement of these two opposed jets will stall the high jet velocity, recovering the velocity energy and convert it to a positive pressure. Any cavities initiating in the vena contracta are forced to collapse in the liquid filled space between the two orifices ensuring that no cavitation damage can occur to any valve element.

Typical parameters for the arrangement shown in FIG. 3 would be a 12-inch supply with two 8 inch branches and terminated in 8 inch knife gate valves spaced 21 inches apart and at least 42 inches below the liquid surface of the discharge basin. The invention testing has shown that devices can be produced that are free from cavitation damage, undesired choking, and freedom from plugging with particulate matter. The sharp-edged orifices as used in the valve of the invention have demonstrated long life capability even on light slurry service by maintaining an initially sharp edge over a long period of time which results in the stabilization of loss characteristic of the valve at any set opening over extended usage.

I claim:

1. The method of controlling dissipation of liquid pressure energy in liquid flowing as a stream comprising the steps of separating the stream into only two symmetrical flow paths, placing at the end of each flow path a single variable orifice which form at the end of each path matched jets having equal cross-sectional area, spacing the orifices apart a distance whereby the vena contracta of each is spaced apart, directing each jet toward the other into an unobstructed liquid filled space between the two orifices and effecting a stable dissipation zone between the two vena contractas and discharging the flow of the said unobstructed space with substantially spherical expansion.

2. The method of controlling dissipation of liquid pressure energy in liquid flowing as a stream without cavitation damage or choking of the flow due to vapor formation comprising the steps of:
   a. separating the stream into two symmetrical flow paths
   b. terminating each of the two paths in a single adjustable orifice having equal cross-sectional area with the orifices positioned to allow the jets formed by the flow through the orifices to oppose each other in an unobstructed liquid filled space,
   c. spacing the orifices apart a dimension equal to the sum of an hydraulically formed pressure dissipation zone plus twice the distance from an orifice to its hydraulically formed vena contracta,
   d. and discharging the flow from the unobstructed space into a downstream flow area substantially greater than the area of the supply stream.

3. A valve assembly for dissipating pressure in a liquid comprising two variable orifices, an orifice actuating means mounted at the ends of symmetrical flow paths, said orifices axially facing one another in a liquid filled space, having equal cross-sectional area and spaced apart substantially within the range of $-5\%$ to $+30\%$ of a distance S defined by the expression $$[1.3 + 0.1 \sqrt[4]{\Delta P}]d$$

where $\Delta P$ equals the maximum design dissipation pressure and $d$ is the flow path diameter, said orifices directing jets at each other in an unobstructed liquid filled space and being spaced apart a distance to create a stable dissipation zone therebetween, the flow discharging from the said zone with substantially spherical expansion.

4. A valve assembly as in claim 3 wherein the flow paths are symmetrical piping assemblies and the valve assembly is adapted to be submerged in a liquid to be controlled at a minimum depth of 2S and wherein the orifices have actuating means linked together to give matched motions and identical orifice openings.

* * * * *